United States Patent
Xu et al.

(10) Patent No.: US 12,496,652 B2
(45) Date of Patent: Dec. 16, 2025

(54) WELDING WIRE REMAINING AMOUNT DETECTION AND WARNING SYSTEM

(71) Applicant: Harbin Welding Institute Limited Company, Heilongjiang (CN)

(72) Inventors: Fujia Xu, Heilongjiang (CN); Ruolong Qiu, Heilongjiang (CN); Yicheng Yang, Heilongjiang (CN); Rong Li, Heilongjiang (CN); Hongwei Li, Heilongjiang (CN); Yandong Zhang, Heilongjiang (CN); Nannan He, Heilongjiang (CN); Bao Jiang, Heilongjiang (CN); Lin Li, Heilongjiang (CN)

(73) Assignee: Harbin Welding Institute Limited Company, Harbin (CN)

(*) Notice: Subject to any disclaimer, the term of this patent is extended or adjusted under 35 U.S.C. 154(b) by 0 days.

(21) Appl. No.: 19/229,428

(22) Filed: Jun. 5, 2025

(65) Prior Publication Data

US 2025/0375828 A1  Dec. 11, 2025

(30) Foreign Application Priority Data

Jun. 7, 2024 (CN) .......................... 202410737391.9

(51) Int. Cl.
| | | |
|---|---|---|
| *B23K 9/095* | (2006.01) | |
| *E21B 17/20* | (2006.01) | |
| *E21B 43/12* | (2006.01) | |
| *E21B 47/04* | (2012.01) | |
| *G01B 7/00* | (2006.01) | |
| *G01B 7/02* | (2006.01) | |
| *G01B 7/04* | (2006.01) | |

(52) U.S. Cl.
CPC ............ *B23K 9/0956* (2013.01); *G01B 7/003* (2013.01); *G01B 7/026* (2013.01); *G01B 7/046* (2013.01); *E21B 17/20* (2013.01); *E21B 43/127* (2013.01); *E21B 47/04* (2013.01)

(58) Field of Classification Search
CPC ...... B23K 9/0956; G01B 7/046; G01B 7/003; G01B 7/026; E21B 47/04; E21B 17/20; E21B 43/127
USPC .......................................................... 324/206
See application file for complete search history.

(56) References Cited

U.S. PATENT DOCUMENTS

| | | | | |
|---|---|---|---|---|
| 2004/0011775 A1* | 1/2004 | Hackl | ..................... | G01P 3/806 |
| | | | | 219/124.34 |
| 2011/0220629 A1* | 9/2011 | Mehn | ..................... | B65H 51/30 |
| | | | | 219/136 |
| 2014/0183176 A1* | 7/2014 | Hutchison | ............ | B23K 9/0956 |
| | | | | 219/124.02 |

(Continued)

*Primary Examiner* — Raul J Rios Russo

(57) ABSTRACT

There is provided a welding wire remaining amount detection and warning system which relates to the welding field. The present disclosure aims to solve the problem of inability to detect the welding wire remaining amount in the laser composite welding makeup device. In the present disclosure, in the welding wire remaining amount detection process, based on electromagnetic induction principle, the equivalent inductance of the coil decreases along with decrease of the welding wire. The change of the equivalent inductance of the coil is converted by the LC oscillator circuit into a directly-collectable frequency change signal. By detecting the value of the current frequency, the current welding wire remaining amount can be determined.

10 Claims, 3 Drawing Sheets

(56) References Cited

U.S. PATENT DOCUMENTS

| | | | |
|---|---|---|---|
| 2014/0263224 A1* | 9/2014 | Becker | G09B 19/24 |
| | | | 219/124.5 |
| 2018/0243852 A1* | 8/2018 | Hilton | B23K 9/0953 |
| 2022/0161359 A1* | 5/2022 | Mayer | B23K 9/1278 |

* cited by examiner

WELDING WIRE REMAINING AMOUNT DETECTION AND WARNING SYSTEM

CROSS-REFERENCE TO RELATED APPLICATION

This application claims priority from the Chinese patent application 2024107373919 filed Jun. 7, 2024, the content of which is incorporated herein in the entirety by reference.

TECHNICAL FIELD

The present disclosure belongs to the welding field and in particular relates to a welding wire remaining amount detection technology.

BACKGROUND

The laser composite welding makeup device is an efficient and advanced processing technology, which, compared with the traditional welding processing method, has the advantages of fast processing speed, less working flow, high product consistency, and significant reduction of the working intensity of the production personnel and the like. In order to increase the processing and production efficiency, the welding wire reel should be changed in advance upon shortage of the welding wire, so as to shorten the makeup processing time and noticeably improve the processing efficiency. However, in the actual production, because the welding pass is long and the welding wire reel is located inside the wire feed box, the production personnel cannot check the rough remaining amount of the welding wire anytime. Further, because the personnel cannot accurately determine whether the remaining amount of the reeled welding wire is sufficient for use in this welding, the shortage of the welding wire may frequently occur at the end during the laser composite welding process. Furthermore, because the personnel cannot accurately determine the remaining amount of the welding wire, they often change the welding wire reel at the time of presence of a large amount of the welding wire in the welding wire reel in order to avoid the shortage of the welding wire in the welding process. Also, the welding wire, once changed, becomes useless, which results in a large amount of unnecessary wastes. Therefore, whether the remaining amount of the welding wire is sufficient or not becomes extremely significant for the laser composite welding makeup device. It is impossible to accurately calculate the remaining amount of the welding wire by simply using wire feeding software algorithm. Further, the contact detection device has the disadvantages of short service life, and inconvenience of wire change; the use of the weighing device leads to overly complex designing and mounting of the reeled welding wire.

SUMMARY

In order to solve the problem of inability to detect the remaining amount of the welding wire in the laser composite welding makeup device, the present disclosure provides a welding wire remaining amount detection and warning system.

The welding wire remaining amount detection system includes: a detection coil, a detection circuit and a controller;
the detection coil is located inside a magnetic field generated by a detected welding wire;
the detection circuit is configured to convert an equivalent inductance of the detection coil into a frequency signal in real time;
the controller is configured to obtain a mapping relationship of a welding wire remaining amount and the frequency signal based on adaptive algorithm and calculate the welding wire remaining amount in real time by collecting the frequency signal in real time. Furthermore, the above detection coil is an annular spiral shape.

Furthermore, the above detection circuit includes resistors R1 to R6, capacitors C1 to C5, a triode Q1 and a triode Q2;
one end of the capacitor C1 is connected to one end of the resistor R1, one end of the resistor R2, and a base electrode of the triode Q1 at the same time, and the other end of the capacitor C1 is connected to one end of the capacitor C5 and one end of the detection coil at the same time;
a collector electrode of the triode Q1 is connected to one end of the capacitor C2 and one end of the resistor R3 at the same time, and an emitter electrode of the triode Q1 is connected to one end of the resistor R4 and one end of the capacitor C3 at the same time;
the other end of the capacitor C2 is connected to one end of the capacitor C4, one end of the resistor R5 and the other end of the detection coil at the same time;
the other end of the resistor R5 is connected to a base electrode of the triode Q2;
a collector electrode of the triode Q2 is connected to one end of the resistor R6 and jointly serve as a frequency signal output end of the detection circuit;
the other end of the resistor R1, the other end of the resistor R3 and the other end of the resistor R6 are jointly connected to a positive pole of a power supply;
The other end of the resistor R2, the other end of the resistor R4, the other end of the capacitor C3, the other end of the capacitor C4, the other end of the capacitor C5 and an emitter electrode of the triode Q2 are jointly connected to a power ground.

Furthermore, the above detection circuit is configured to convert the equivalent inductance of the detection coil into the frequency signal, where the frequency signal is obtained as below:

$$F = \frac{1}{2*\pi*\sqrt{LC}}$$

where F is a value of the frequency signal, L is an equivalent inductance of the detection coil, C is an equivalent capacitor after the capacitor C4 and the capacitor C5 are series-connected.

The welding wire remaining amount warning system is implemented based on the above welding wire remaining amount detection system and further includes an upper computer;
the controller is further configured to send the calculated welding wire remaining amount, a wire feeding speed, a welding speed, and a weld seam length to the upper computer in real time;
the upper computer is configured to calculate a welding wire required amount in real time based on the wire feeding speed, the welding speed and the weld seam length, and compare the welding wire required amount with the welding wire remaining amount in real time so that, when the welding wire remaining amount is less than the welding wire required amount, the upper computer sends a warning signal to the controller.

Furthermore, calculating the welding wire required amount in real time based on the wire feeding speed, the welding speed and the weld seam length includes:

calculating the welding wire required amount in the following formula:

the welding wire required amount=the weld seam length/the welding speed*the wire feeding speed.

Furthermore, the above welding wire remaining amount warning system further includes an LED display panel which includes three green indicator lamps and one red indicator lamp;

the three green indicator lamps are used to display the welding wire remaining amount and the number of the green indicator lamps turned on are directly proportional to the welding wire remaining amount;

when the controller receives a warning signal, the three green indicator lamps are all turned off while the red indicator lamp is turned on.

Furthermore, the above upper computer and the controller perform data interaction via RS485 communication interface.

The welding wire remaining amount detection and warning system of the present disclosure has the following beneficial effects.

(1) non-contact detection, no wear and long service life;
(2) simple mechanism easy to mount;
(3) low cost;
(4) detection by conventional physical phenomenon, less susceptible to external influence and high in reliability;
(5) increasing detection sensitivity along with decrease of the welding wire in the welding wire reel, making the detection and warning more accurate;
(6) communication function to read the wire use amount of the current weld seam sent by the upper computer and perform fast determination and warning feedback;
(7) visual and clear display.

In a word, the present disclosure can quickly and accurately detect whether the current welding wire for welding is sufficient, and thus it is applicable to detection of the welding wire remaining amount in the welding field.

BRIEF DESCRIPTIONS OF THE DRAWINGS

DETAILED DESCRIPTIONS OF EMBODIMENTS

The technical solutions in the embodiments of the present disclosure will be fully and clearly described below in combination with the drawings in the embodiments of the present disclosure. Apparently, the described embodiments are merely some embodiments of the present disclosure rather than all embodiments. All other embodiments obtained by those skilled in the arts based on these embodiments in the present disclosure without carrying out creative work shall fall within the scope of the present disclosure. It should be noted that in case of no conflicts, the embodiments and the features in the embodiments in the present disclosure can be mutually combined.

Figure 1:
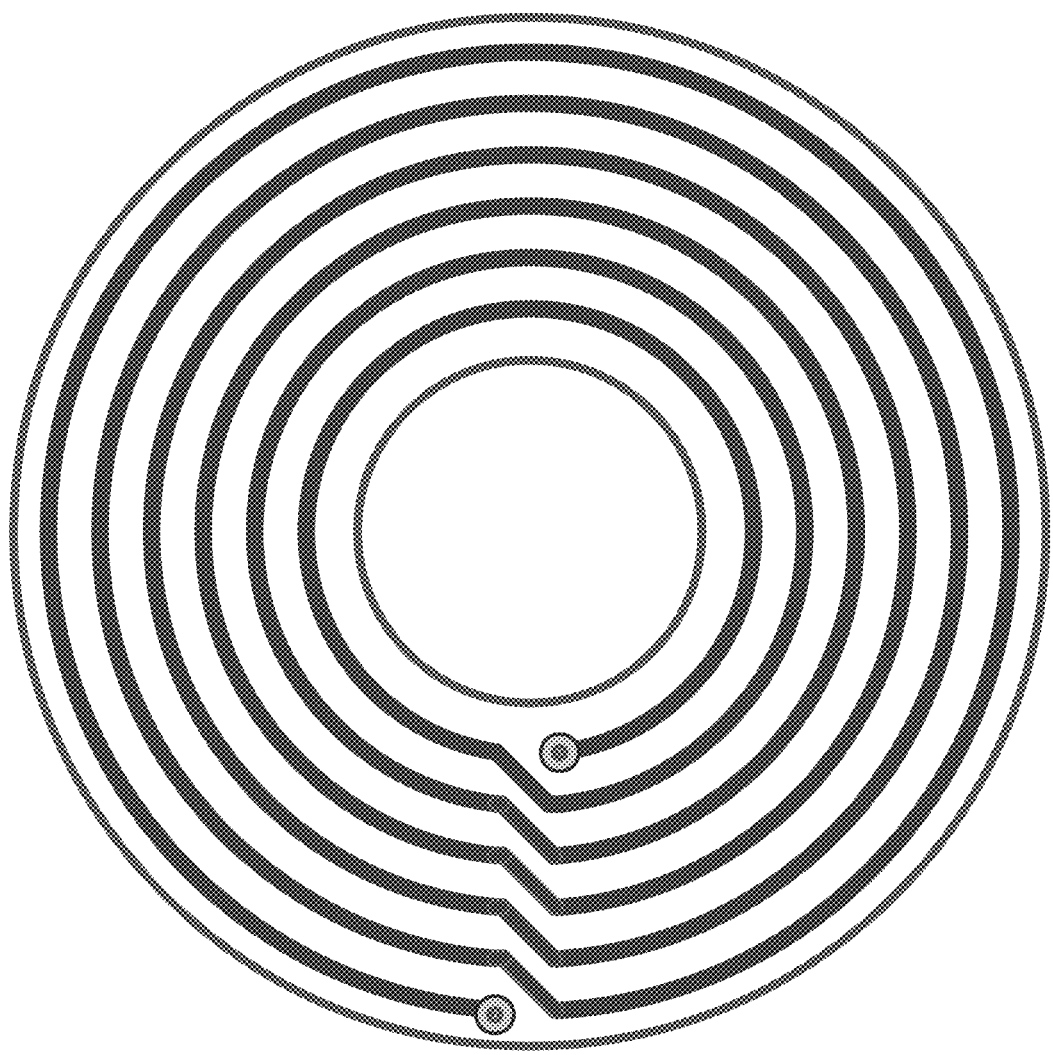
FIG. 1 is a structural schematic diagram of a detection coil.
Figure 2:
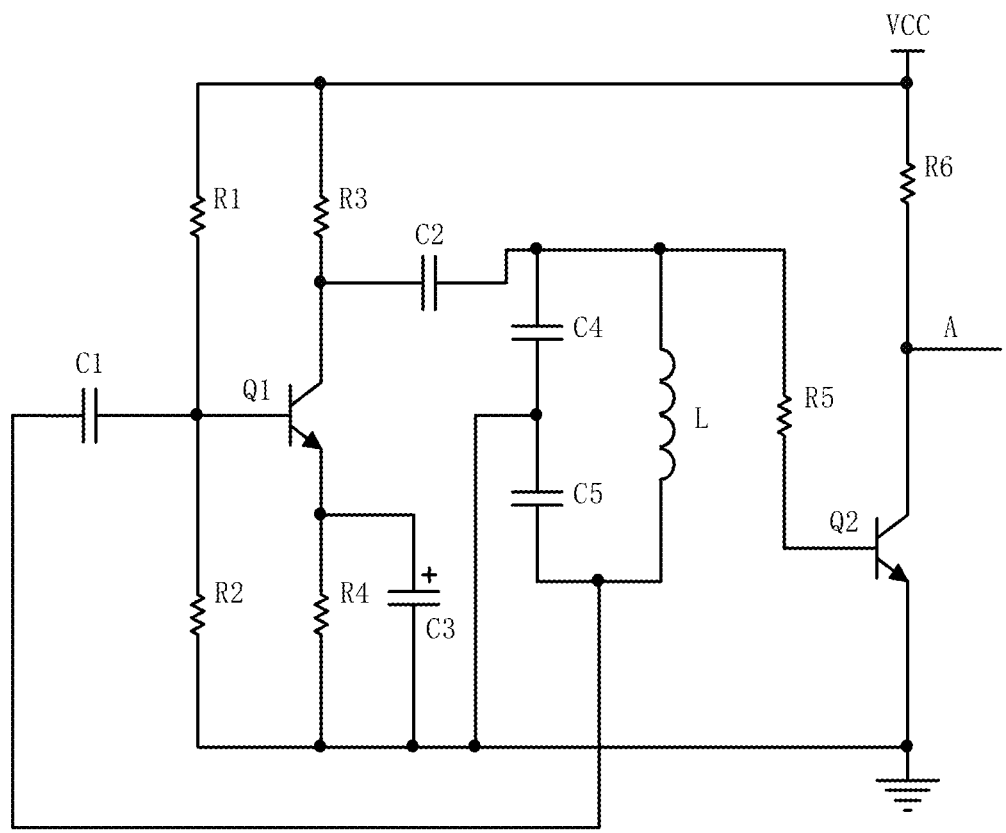
FIG. 2 is a structural schematic diagram of a detection circuit.
Figure 3:
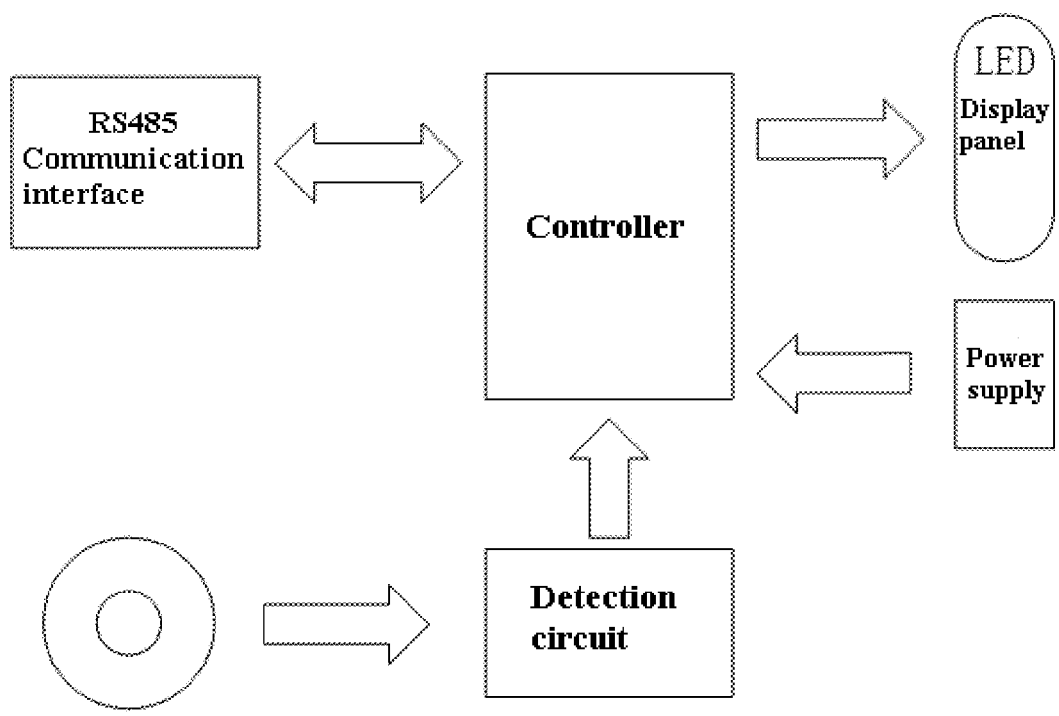
FIG. 3 is a schematic diagram of composition of a welding wire remaining amount detection system.

Specific embodiment 1: with reference to FIGS. 1, 2 and 3, this embodiment is detailed. This embodiment provides a welding wire remaining amount detection system which includes a detection coil, a detection circuit and a controller.

The detection coil is a key part of the welding wire remaining amount detection system, which has the advantages of enough detection area, enough inductance and sensitivity, stability, sturdiness, ease of mounting, resistance to dust, water and electricity leakage of use environment and use safety. Based on the above requirements, in this embodiment, as shown in FIG. 1, an on-board coil is designed on a printed circuit board (PCB). In order to increase the sensitivity, the printed circuit board has a similar size to a wire feeding reel. In order to facilitate mounting, an annular spiral flat-spread type is adopted so that it can be attached to a sidewall of the wire feeding box to enable the detection coil to be located inside a magnetic field generated by the detected welding wire.

Since the welding wire remaining amount can affect the amount of the magnetically-conductive media and further change the inductance of the detection coil, the equivalent inductance of the detection coil is converted into a collectable frequency signal based on the principle of inductance changing the detection oscillation frequency in this embodiment. Specifically, as shown in FIG. 2, in this embodiment, a three-point oscillator circuit is employed, where L is an equivalent symbol of the detection coil, and A is an output end of the detection circuit. The equivalent inductance of the detection coil is converted into the frequency signal, where the frequency signal is obtained as below:

$$F = \frac{1}{2*\pi*\sqrt{LC}}$$

where F is a value of the frequency signal, L is an equivalent inductance of the detection coil, and C is an equivalent capacitor after the capacitor C4 and the capacitor C5 are series-connected.

The detection circuit employs the electromagnetic induction detection principle, so that the equivalent inductance of the detection coil is converted into the frequency signal. The detection circuit includes resistors R1 to R6, capacitors C1 to C5, a triode Q1, and a triode Q2;

one end of the capacitor C1 is connected to one end of the resistor R1, one end of the resistor R2, and a base electrode of the triode Q1 at the same time, and the other end of the capacitor C1 is connected to one end of the capacitor C5 and one end of the detection coil at the same time;

a collector electrode of the triode Q1 is connected to one end of the capacitor C2 and one end of the resistor R3 at the same time, and an emitter electrode of the triode Q1 is connected to one end of the resistor R4 and one end of the capacitor C3 at the same time;

the other end of the capacitor C2 is connected to one end of the capacitor C4, one end of the resistor R5 and the other end of the detection coil at the same time;

the other end of the resistor R5 is connected to a base electrode of the triode Q2;

a collector electrode of the triode Q2 is connected to one end of the resistor R6 and jointly serve as a frequency signal output end of the detection circuit;

the other end of the resistor R1, the other end of the resistor R3 and the other end of the resistor R6 are jointly connected to a positive pole of a power supply; the other end of the resistor R2, the other end of the resistor R4, the other end of the capacitor C3, the other end of the capacitor C4, the other end of the capacitor C5 and an emitter electrode of the triode Q2 are jointly connected to a power ground.

In order to lower the costs, the controller in the embodiment obtains a mapping relationship of the welding wire remaining amount and the real-time frequency value at the port A of the collection circuit based on adaptive algorithm to calculate a current welding wire remaining amount. Specifically, in this embodiment, a highest upper limit of the welding wire of the reel which is full and a lowest lower limit of the welding wire of the reel which is empty are firstly automatically recorded, and then adaptive correction is carried out based on the upper and lower limits and the current calculation value. The more use enables the determination value of the current welding wire remaining amount to be more accurate. External interference will be eliminated to ensure the accuracy of the collection. The detection and calculation processes are both carried out under non-welding state. In the practical applications, each time the welding wire is changed, the state of the new welding wire is learned based on self-learning correction algorithm, and then comparison operation is performed based on the state of the new welding wire and the previously-recorded state to calculate a new limit value, and then one calibration is performed on the remaining amount algorithm based on the new limit value.

Specific embodiment 2: with reference to FIG. 3, this embodiment is detailed below. This embodiment provides a welding wire remaining amount warning system which is implemented based on the welding wire remaining amount detection system in the specific embodiment 1. The welding wire remaining amount warning system further includes an upper computer and an LED display panel. The LED display panel includes three green indicator lamps and one red indicator lamp. The three green indicator lamps are used to display the welding wire remaining amount, and the number of the green indicator lamps turned on is directly proportional to the welding wire remaining amount. When the controller receives a warning signal, the three green indicator lamps are all turned off and the red indicator lamp is turned on.

In order to adapt to the field environment, the controller interacts data with the upper computer based on RS485 protocol in this embodiment. When receiving a next welding requirement from the upper computer, the controller feeds warning information back to the upper computer when detecting the welding wire remaining amount is lower than the next welding requirement, or feeds remaining amount information back to the upper computer when detecting the welding wire use amount is satisfied. Furthermore, the display state can be changed to prompt the production personnel to determine whether to change the welding wire. The welding wire remaining amount warning and display part is a visual and simple LED indicator lamp solution, which is specifically composed vertically of four indicator lamps and mounted on a wall of the wire feeding box. The three green indicator lamps display the welding wire remaining state. Along with decrease of the welding wire amount, the green indicator lamps gradually go off till the lowest red indicator lamp is turned on to indicate the shortage warning of the welding wire. When the welding wire is insufficient, the three green indicator lamps are turned off and the red indicator lamp is turned on separately.

The controller is further configured to send the calculated welding wire remaining amount, a wire feeding speed, a welding speed and a weld seam length to the upper computer in real time.

The upper computer is configured to calculate a welding wire required amount in real time based on the wire feeding speed, the welding speed and the weld seam length, and compare the welding wire required amount with the welding wire remaining amount in real time so that, when the welding wire remaining amount is less than the welding wire required amount, the upper computer sends a warning signal to the controller.

Based on the wire feeding speed, the welding speed and the weld seam length, calculating the welding wire required amount in real time includes:

calculating the welding wire required amount in the following formula:

$$\text{the welding wire required amount} = \text{the weld seam length}/\text{the welding speed} * \text{the wire feeding speed}.$$

Specific Embodiment 3

When the large-breadth laser composite welding automatic makeup equipment employs laser arc composite welding, because welding on the long weld seams of large work pieces is not allowed to be interrupted, the requirement for the welding wire remaining amount is more important in the welding process to ensure the weld seams will not affect the entire welding quality due to shortage of welding wire.

The detection coil of the remaining welding wire detection and warning device is attached to the side wall of the wire feeding box of the large-breadth laser composite welding automatic makeup equipment, and the detection coil is connected to the detection circuit and the controller and the RS485 communication interface is communicated to the upper computer for communication. The LED display panel is attached to the eye-catching position of the wire feeding box and the controller is powered on. The system can automatically record the current detection value and display the current welding wire remaining amount by the LED indicator lamps. Each time the new welding wire reel is put, the system can automatically learn and check the detection data.

Before the welding is started, the upper computer can send the wire feeding speed, the welding speed and the weld seam length of this welding via the RS485 interface, and the welding wire remaining amount warning controller of this device calculates the welding wire use amount and compares the welding wire use amount with the detected welding wire remaining amount, so that when the welding use amount for this welding is not satisfied, the controller immediately feeds welding wire shortage warning information to the upper computer. The large-breadth laser composite welding automatic makeup equipment of the upper computer will suspend the before-welding preparation work and resume the production when the welding wire remaining amount is satisfactory. Further, this device will change the display state of the LED display panel: the three green LED indicator lamps are turned off and the red LED indicator lamp is turned on. In this way, the production personnel is prompted to change the welding wire. When the welding wire use amount is satisfied, the controller feeds the welding wire remaining amount information back to the upper computer, and the large-breadth laser composite welding automatic makeup equipment of the upper computer will continue next welding production. Further, this device will change the display state of the LED display panel: the green LED indicator lamps display corresponding remaining amount.

By the above method, the operator can know in advance whether the welding wire satisfies the current work piece processing before the welding processing and determine whether to change the welding wire, which greatly increases the stability and reliability of the welding process, and avoids significant loss arising from human's mis-judgment while avoiding unnecessary waste of the reeled welding wire, greatly saving the production costs.

In conclusion, the present disclosure provides a welding wire remaining amount detection and warning system. In the welding wire remaining amount detection process, based on electromagnetic induction principle, when the welding wire reel is mounted into the wire feeding box attached with the detection coil, the media condition of the coil is changed, and the equivalent inductance of the coil decreases along with decrease of the metal welding wire in the wire feeding reel. Since the body of the wire feeding reel and the outer housing of the wire feeding box are both made of nonmetal material, the detection result is not affected based on electromagnetic induction principle. Furthermore, the detection coil and the wire feeding reel are mounted at the fixed positions, and therefore, the change of the equivalent inductance of the coil can be converted by the LC oscillator circuit into a directly-collectable frequency change signal. By detecting the value of the current frequency, the current welding wire remaining amount can be determined. The present disclosure has the advantages of noncontact detection, ease of wire change, simple mounting, low cost, high reliability and high accuracy.

Although the present disclosure is described by referring to the specific embodiments herein, it should be understood that these embodiments are merely examples of the principles and applications of the present disclosure. Therefore, it should be understood that many modifications can be made to the illustrative embodiments and other arrangements can be designed as long as the spirit and scope of the present disclosure defined in the appended claims are observed. Furthermore, it should be understood that different dependent claims and the features in the specification can be combined in a manner different from the original claims. It can also be understood that the features described in combination with individual embodiments can be used in other embodiments.

What is claimed is:

1. A welding wire remaining amount detection system, comprising a detection coil, a detection circuit and a controller; wherein, the detection coil is located inside a magnetic field generated by a detected welding wire;

the detection circuit is configured to convert an equivalent inductance of the detection coil into a frequency signal in real time;

the controller is configured to obtain a mapping relationship of a welding wire remaining amount and the frequency signal based on adaptive algorithm and further calculate the welding wire remaining amount in real time by collecting the frequency signal in real time;

the detection circuit comprises resistors R1 to R6, capacitors C1 to C5, a triode Q1 and a triode Q2;

one end of the capacitor C1 is connected to one end of the resistor R1, one end of the resistor R2, and a base electrode of the triode Q1 at the same time, and the other end of the capacitor C1 is connected to one end of the capacitor C5 and one end of the detection coil at the same time;

a collector electrode of the triode Q1 is connected to one end of the capacitor C2 and one end of the resistor R3 at the same time, and an emitter electrode of the triode Q1 is connected to one end of the resistor R4 and one end of the capacitor C3 at the same time;

the other end of the capacitor C2 is connected to one end of the capacitor C4, one end of the resistor R5 and the other end of the detection coil at the same time;

the other end of the resistor R5 is connected to a base electrode of the triode Q2;

a collector electrode of the triode Q2 is connected to one end of the resistor R6 and jointly serve as a frequency signal output end of the detection circuit;

the other end of the resistor R1, the other end of the resistor R3 and the other end of the resistor R6 are jointly connected to a positive pole of a power supply;

the other end of the resistor R2, the other end of the resistor R4, the other end of the capacitor C3, the other end of the capacitor C4, the other end of the capacitor C5 and an emitter electrode of the triode Q2 are jointly connected to a power ground.

2. The welding wire remaining amount detection system of claim 1, wherein the detection coil is an annular spiral shape.

3. The welding wire remaining amount detection system of claim 1, wherein the detection circuit is configured to convert the equivalent inductance of the detection coil into the frequency signal, and the frequency signal is obtained as below:

$$F = \frac{1}{2*\pi*\sqrt{LC}}$$

wherein F is a value of the frequency signal, L is an equivalent inductance of the detection coil, C is an equivalent capacitor after the capacitor C4 and the capacitor C5 are series-connected.

4. A welding wire remaining amount warning system, wherein the welding wire remaining amount warning system is implemented based on the welding wire remaining amount detection system of claim 1 and the welding wire remaining amount warning system further comprises an upper computer;

the controller is further configured to send the calculated welding wire remaining amount, a wire feeding speed, a welding speed, and a weld seam length to the upper computer in real time;

the upper computer is configured to calculate a welding wire required amount in real time based on the wire feeding speed, the welding speed and the weld seam length, and compare the welding wire required amount and the welding wire remaining amount in real time so that, when the welding wire remaining amount is less than the welding wire required amount, the upper computer sends a warning signal to the upper computer.

5. The welding wire remaining amount warning system of claim 4, wherein calculating the welding wire required amount in real time based on the wire feeding speed, the welding speed and the weld seam length comprises:

calculating the welding wire required amount in the following formula:

the welding wire required amount=the weld seam
length/the welding speed*the wire feeding
speed.

6. The welding wire remaining amount warning system of claim 4, further comprising an LED display panel which comprises three green indicator lamps and one red indicator lamp;
   wherein the three green indicator lamps are used to display the welding wire remaining amount and the number of the green indicator lamps turned on are directly proportional to the welding wire remaining amount;
   when the controller receives the warning signal, the three green indicator lamps are all turned off while the red indicator lamp is turned on.

7. The welding wire remaining amount warning system of claim 6, wherein the upper computer and the controller perform data interaction via RS485 communication interface.

8. The welding wire remaining amount warning system of claim 4, wherein the detection coil is an annular spiral shape.

9. The welding wire remaining amount warning system of claim 4 wherein the detection circuit is configured to convert the equivalent inductance of the detection coil into the frequency signal, and the frequency signal is obtained as below:

$$F = \frac{1}{2*\pi*\sqrt{LC}}$$

wherein F is a value of the frequency signal, L is an equivalent inductance of the detection coil, C is an equivalent capacitor after the capacitor C4 and the capacitor C5 are series-connected.

10. The welding wire remaining amount warning system of claim 5, further comprising an LED display panel which comprises three green indicator lamps and one red indicator lamp;
   wherein the three green indicator lamps are used to display the welding wire remaining amount and the number of the green indicator lamps turned on are directly proportional to the welding wire remaining amount;
   when the controller receives the warning signal, the three green indicator lamps are all turned off while the red indicator lamp is turned on.

* * * * *